(12) United States Patent
Dutsky et al.

(10) Patent No.: US 9,346,489 B2
(45) Date of Patent: May 24, 2016

(54) STEERING SYSTEM WITH MAGNETIC TORQUE OVERLAY

(71) Applicant: Steering Solutions IP Holding Corporation, Saginaw, MI (US)

(72) Inventors: Jason A. Dutsky, Bay City, MI (US); Jeffrey M. Powell, Bay City, MI (US); Brenda L. Martin, Chesaning, MI (US); Joel E. Birsching, Vassar, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/516,695

(22) Filed: Oct. 17, 2014

(65) Prior Publication Data

US 2016/0107681 A1    Apr. 21, 2016

(51) Int. Cl.
*B62D 5/065* (2006.01)
*B62D 5/09* (2006.01)
*B62D 5/083* (2006.01)

(52) U.S. Cl.
CPC .............. *B62D 5/065* (2013.01); *B62D 5/0835* (2013.01); *B62D 5/09* (2013.01)

(58) Field of Classification Search
CPC ......... B62D 5/14; B62D 5/065; B62D 5/0835
See application file for complete search history.

(56) References Cited

U.S. PATENT DOCUMENTS

| | | | |
|---|---|---|---|
| 5,267,905 A | 12/1993 | Wenzel et al. | |
| 5,655,621 A | 8/1997 | Birsching | |
| 5,725,023 A * | 3/1998 | Padula ................... | B62D 5/06 137/596.17 |
| 6,949,025 B1 | 9/2005 | Kraus et al. | |
| 7,364,006 B2 | 4/2008 | Birsching et al. | |
| 7,624,819 B1 | 12/2009 | LeBlanc et al. | |
| 2005/0258384 A1 | 11/2005 | Leutner | |
| 2008/0093155 A1 | 4/2008 | Ishikawa et al. | |
| 2013/0199865 A1 | 8/2013 | Park | |
| 2014/0332308 A1 * | 11/2014 | Kirschbaum ............ | B62D 6/10 180/421 |
| 2015/0047919 A1 * | 2/2015 | Dutsky ................. | B62D 5/0835 180/421 |

FOREIGN PATENT DOCUMENTS

GB    329900 A    5/1930

OTHER PUBLICATIONS

EESR issued Mar. 24, 2015 in corresponding EP Application No. 14189500.3.
English Translation of German Office Action for related German Application No. DE 10 2010 009 845.0, Issued: Oct. 9, 2015; 7 pages.
German Office Action for related German Application No. DE10 2010 009 845.0, Issued: Oct. 9, 2015; 7 pages.

* cited by examiner

*Primary Examiner* — Kevin Hurley
(74) *Attorney, Agent, or Firm* — Cantor Colburn LLP

(57) ABSTRACT

A steering system with magnetic torque overlay of a vehicle is provided. The system comprises a hydraulic valve and differential-pressure transducer that monitors pressure created by the valve due to torque exerted by a driver of the vehicle in various directions on a steering wheel thereof. The transducer is fastened to a recirculating ball steering gear. A magnetic actuator generates an output of torque required from the steering gear for a maneuver of the steering wheel and applies the torque to the valve independently of input by the driver. A permanent magnet is located proximate the actuator. A control module calculates an appropriate amount of electric current and sends it to the actuator to generate the output torque. The torque is added to or subtracted from the system in any of the directions independently of the driver input by the pressure-monitoring and inputs from the vehicle into the control module.

18 Claims, 2 Drawing Sheets

STEERING SYSTEM WITH MAGNETIC TORQUE OVERLAY

CROSS-REFERENCE TO RELATED APPLICATION

This application is based upon and claims benefit of the filing date of U.S. Patent Application 61/893,554 filed on Oct. 21, 2013 and entitled "Steering System with Magnetic Torque Overlay," which is incorporated herein by reference in its entirety.

FIELD OF INVENTION

The invention relates to a steering system of a vehicle and, in particular, such a system having variable-effort steering.

BACKGROUND OF INVENTION

In a motor vehicle, a "pulling" state, for example, can occur such that a driver of the vehicle has to input torque into a steering system thereof to maintain a straight path. This state can be caused by vehicle, road, and/or weather conditions (such as a crosswind that requires a force for the steering system to overcome) or an imbalance in the steering system (such as if a valve is balanced in a "null" position and a torsion bar is on center, but a valve spool is creating pressure in the steering system). Either way, an input torque correction is required by the driver.

In the steering system, a recirculating ball steering gear may use an open-center-rotary valve to port hydraulic fluid to either side of a piston of the gear upon inputs from the driver. However, some systems may not have any capability to perform additional "performance" features or functions such as park-assist, lane-keeping, lead-and-pull compensation, driver-alert, active return-to-center, active dampening, or stability-control assist.

Also, an electric power-steering system or hydraulic rack-and-pinion steering system may not have sufficient output to perform a park-assist or may not be able to be packaged in the vehicle. A magnetic actuator may be used to apply torque to a hydraulic valve of a steering system independently of input from the driver. Such use allows the steering system to perform, for example, lead-and-pull compensation, active return-to-center, and active dampening.

However, to perform park-assist, size of the magnetic actuator may need to be increased such that a sufficient amount of torque is produced in the steering system to generate full hydraulic assist. Therefore, the magnetic actuator may be difficult to package in the vehicle.

Accordingly, it is desirable to provide a steering system of a vehicle that has the capability to perform the additional "performance" features. More specifically, it is desirable to provide a hydraulically assisted power-steering system that has sufficient output and can be packaged in the vehicle.

SUMMARY OF INVENTION

In accordance with a non-limiting exemplary embodiment of the invention, a steering system with magnetic torque overlay of a vehicle is provided. The system comprises a hydraulic valve and differential-pressure transducer that monitors pressure created by the hydraulic valve due to torque exerted by a driver of the vehicle in various directions on a steering wheel thereof. The transducer is fastened to a recirculating ball steering gear. A magnetic actuator generates an output of torque required from the recirculating ball steering gear for a maneuver of the steering wheel and applies the torque to the hydraulic valve independently of input by the driver. At least one permanent magnet is located proximate the magnetic actuator. A control module calculates an appropriate amount of electric current and sends it to the magnetic actuator to generate the output torque. The torque is added to or subtracted from the steering system in any of the directions independently of the driver input by the pressure-monitoring and inputs from the vehicle into the control module.

By varying the size of the magnetic actuator, the steering system enables park-assist along with lane-keeping, lead-and-pull compensation, driver-alert, active return-to-center, active dampening, and stability-control assist. Furthermore, the steering system is hydraulically assisted for power-steering, has sufficient output, and can be packaged in the vehicle. In addition, the magnetic actuator can be very compact and smaller in size than current electromagnetic actuators. Moreover, the magnetic actuator can be manufactured fairly easily, which, in combination with the smaller size, makes the magnetic actuator less expensive to manufacture.

BRIEF DESCRIPTION OF EACH FIGURE OF DRAWING

The subject matter that is regarded as the invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION OF EXEMPLARY EMBODIMENTS OF INVENTION

Figure 1:
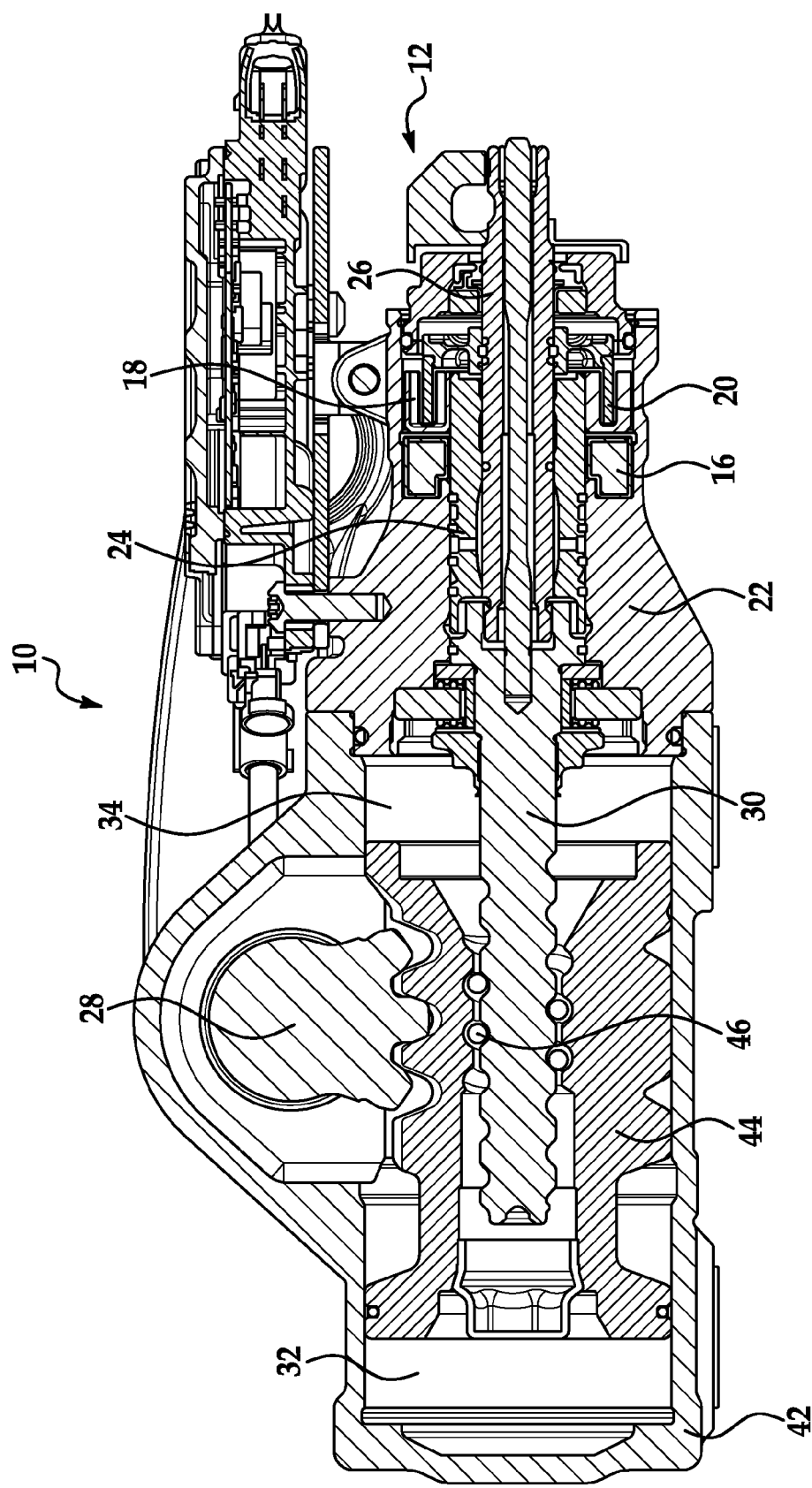
FIG. 1 is a cutaway view showing a non-limiting exemplary embodiment of a vehicle steering system with magnetic torque overlay (MTO) according to the invention.

A power-steering system of a motor vehicle is designed to provide appropriate hydraulic or electrical steering assist to allow a driver of the vehicle to complete a turn thereof. The driver applies a steering input through a manual steering wheel (otherwise known as a hand wheel) that is rotationally connected to a first shaft, which is is rotationally coupled to a second shaft that is, in turn, connected to a steering mechanism. The first and second shafts are torque transmittingly coupled to each other by a compliant member, such as a torsion bar. The torsion bar allows the first shaft to rotate with respect to the second shaft by a predetermined number of degrees (e.g., +/−12 degrees). Mechanical stops prevent further rotation. An amount of the steering assist applied to the steering mechanism is determined as a function of degree of torsional strain or movement in the torsion bar.

A non-limiting exemplary power-steering system is a hydraulic "variable effort" steering (VES) system that includes a steering gear having a proportional control valve and magnetic actuator for varying effective compliance of the torsion bar. The proportional control valve has a valve spool connected to a manual steering wheel, a valve body connected to steerable wheels of the vehicle, and the torsion bar positioned between the valve spool and valve body. Throttling orifices are positioned between the valve body and valve spool to regulate boost pressure of the steering assist when the valve spool is rotated relative to the valve body from a center position by manual effort at the steering wheel. As a result, a centering torque in the torsion bar is induced to effect a tactile response for the driver in the steering wheel. The magnetic actuator includes at least one permanent magnet arranged around a ring that is attached to the valve spool. The magnetic actuator includes also a pole piece attached to the valve body and having pole teeth and an excitation coil magnetically coupled to the pole teeth. The pole piece is rotatable as a unit with the valve body. Certain of the pole teeth are connected to each other by a non-magnetic portion so that they are magnetically decoupled from each other. An electric current can be applied to the coil to induce an electromagnetic torque between the pole piece and ring and, thus, increase or decrease effective torque of the torsion bar, depending upon direction of the current flowing through the coil.

Rotation is about an axis of a composite housing. A rack bar, which cooperates with a pinion head, is supported on the housing for bodily movement perpendicular to the axis in response to rotation of the pinion head. Ends of the rack bar are connected to the wheels in a conventional fashion.

A tubular stub or spool shaft of the steering gear protrudes into the housing at an open end thereof. The proportional control valve is disposed inside the housing and includes the torsion bar inside the spool shaft. The torsion bar defines an inboard end protruding beyond a corresponding inboard end of the spool shaft and force-fitted in the pinion head. The torsion bar defines an outboard end rigidly connected to the spool shaft at an outboard end thereof.

The outboard end of the spool shaft is connected to the steering wheel for rotation as a unit therewith. The spool shaft is supported on the housing for rotation about the axis independent of the pinion head. Relative angular movement between the pinion head and spool shaft is permitted.

A magnetic steering system (Magnasteer) is a VES system that uses the magnetic actuator to vary torsional stiffness of the valve to change actuation, effort, or torque. A control module determines magnitude and the direction of the current applied to the coil of the magnetic actuator to vary the torque as a function of speed of the vehicle. The magnetic actuator is designed to improve its robustness and efficiency in achieving a desired torque.

In accordance with non-limiting exemplary embodiments, magnetic torque overlay (commonly referred to as "MTO") is a system that has been developed to achieve advanced steering features or functions—such as active return-to-center, lead-and-pull compensation, lane-keeping, and park-assist. MTO modifies Magnasteer to provide capability of generating assist for the advanced steering functions without torque of a driver of the vehicle. MTO uses magnets to assist or resist steering input.

Figure 2:
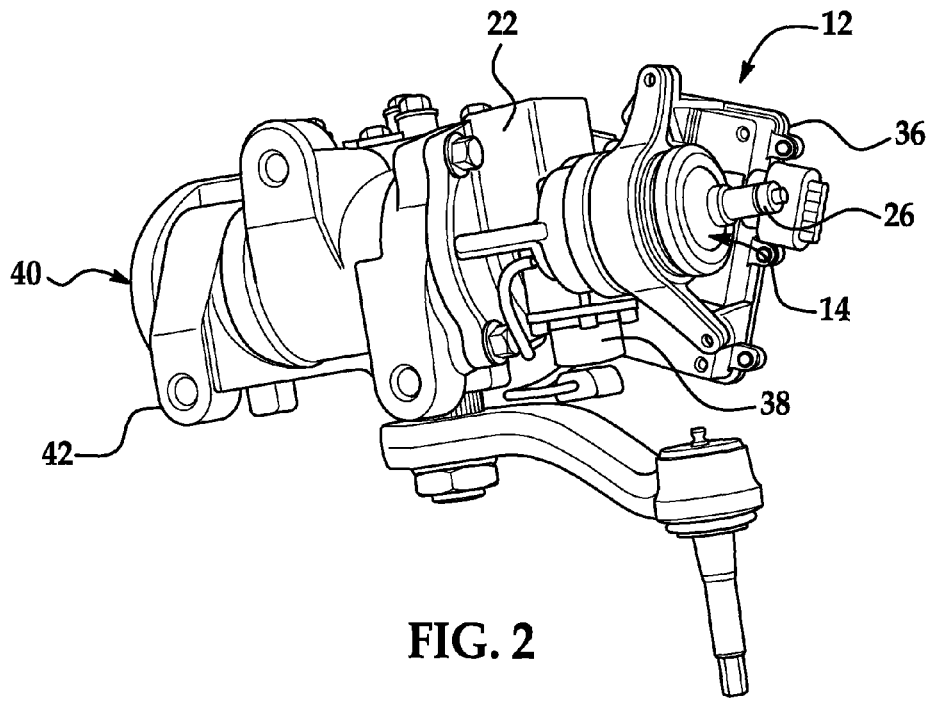
FIG. 2 is a perspective view showing a non-limiting exemplary embodiment of an assembly of the steering system illustrated in FIG. 1.
Figure 3:
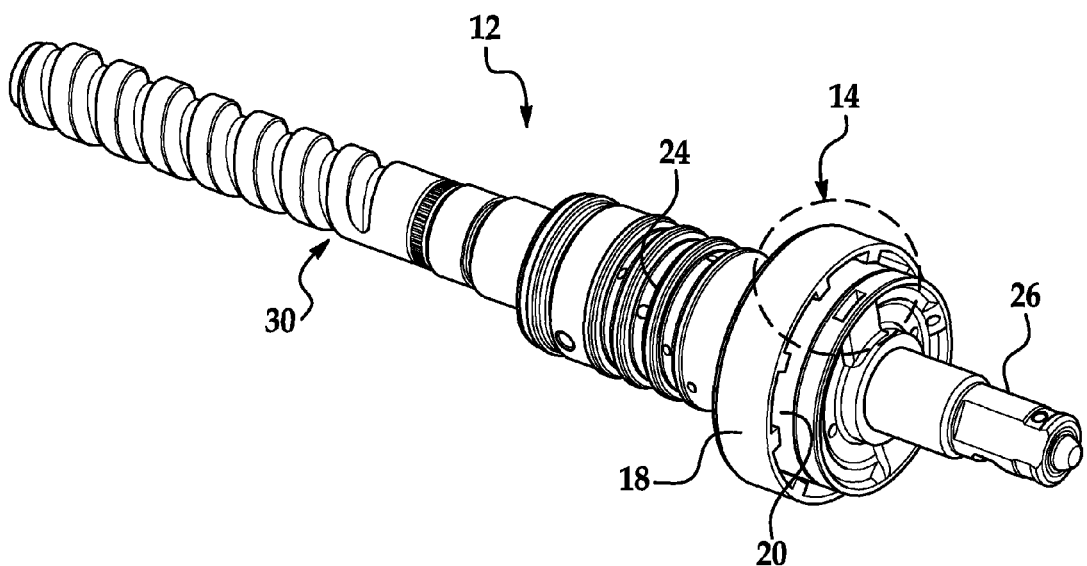
FIG. 3 is a perspective view showing a portion of the assembly illustrated in FIG. 2.

Referring now to the figures, the invention is described below and shown in the drawing with reference to specific exemplary embodiments thereof without limiting same. More specifically, FIG. 1 shows a non-limiting exemplary embodiment of a steering system with MTO according to the invention, generally indicated at 10. FIGS. 2 and 3 show a non-limiting exemplary embodiment of a ball-nut assembly, generally indicated at 12, that forms a part of the steering system 10.

In the embodiment, the assembly 12 includes a magnetic actuator, generally indicated at 14 in FIGS. 2 and 3. The magnetic actuator 14 varies effective centering torque of a torsion bar (not shown) to change a level of the steering assist (i.e., steering-assist boost pressure) achieved for a given manual steering input applied at the steering wheel. In turn, the magnetic actuator 14 is made up of a large stationary exciting electromagnetic coil 16 (FIG. 1), an inner and outer electromagnetic pole 18 (FIGS. 1 and 3) located just above the coil 16, and at least one permanent magnet assembly 20 (FIGS. 1 and 3) located in a center of the pole 18. The steering system 10 includes a valve housing 22 (FIGS. 1 and 2). The coil 16, pole 18, permanent magnet assembly 20, and valve housing 22 define a magnetic assembly. Feel of a steering wheel (not shown) of the vehicle and, thus, steering by a driver of the vehicle is varied by change of strength and polarity of the pole 18, which, in turn, is controlled by change of pulse width and direction of electric current to the coil 16.

The magnetic actuator 14 and pole 18 include a magnetic material suitable for conducting magnetic flux upon application of the current. Examples of such magnetic materials include, but are not limited to, soft magnetic steel, powdered metals, laminated silicon, or any combination having at least one of the foregoing materials. The current flows through the coil 16 when it is desirable to create a magnetic field.

The permanent magnet assembly 20 includes a permanent magnetic material. A "permanent" magnetic material exhibits magnetism even when no electrical current is applied. Examples of a suitable permanent magnet material in this context include, but are not limited to, alloys such as NdFeB, SmCo, and AlNiCo; composite materials such as AlNiCo in a plastic; and any combination having at least one of the foregoing materials.

As shown in at least one of FIGS. 1-3, the assembly 12 also includes a hydraulic valve 24, a spool shaft 26 (a tubular stub or an input shaft 26), an output shaft 28 (Pitman shaft 28), a steering worm 30 (ball screw 30), and right- and left-turn fluid cavities 32, 34. The magnetic actuator 14, hydraulic valve 24, spool shaft 26, output shaft 28, steering worm 30, and fluid cavities 32, 34 are operatively connected to each other.

The valve housing 22 is configured to house the magnetic actuator 14 and hydraulic valve 24. More specifically, the hydraulic valve 24 is disposed inside a part of the valve housing 22 and includes the torsion bar inside the spool shaft 26. The torsion bar is rigidly connected to and protrudes beyond a corresponding end of the spool shaft 26. The spool shaft 26 is connected to the steering wheel for rotation as a unit therewith and is supported for rotation. The hydraulic valve 24 is supported on the spool shaft 26 for rotation independent of the spool shaft 26. A valve spool (not shown) is defined on the spool shaft 26 inside the hydraulic valve 24.

In an aspect of the embodiment, the valve housing 22 is cast-iron. However, it should be appreciated that the valve housing 22 can be made of any material that defines any suitable magnetic and mechanical properties.

With no electric current in the coil 16, magnetic interaction between the permanent magnet assembly 20 and pole 18 due solely to the permanent magnet assembly 20 defines a plurality of neutral or "null" positions of the pole 18 relative to the permanent magnet assembly 20. Electromagnetic torque between the permanent magnet assembly 20 and pole 18 is a function of arbitrary rotational position with no current in the coil 16. In the "null" positions, net-force reactions between the permanent magnet assembly 20 and pole 18 are in static equilibrium so that net-torque reaction between the permanent magnet assembly 20 and pole 18 due to the permanent magnet(s) 20 is zero.

MTO changes assist torque as a function of the vehicle speed. Polarity of the current in the coil 16 in MTO changes direction of the torque to the magnetic actuator 14. So, at any vehicle speed, the current is based upon direction of the steering (i.e., positive in a left turn and negative in a right turn to decrease steering efforts or negative in a left turn and positive in a right turn to increase such efforts).

The steering system 10 includes the assembly 12 and, as shown in FIG. 2, a control module 36 and a differential-pressure transducer 38 that is configured to be fastened to a recirculating ball steering gear, generally indicated at 40. The magnetic actuator 14, hydraulic valve 24, control module 36, transducer 38, and recirculating ball steering gear 40 are configured to add torque to or subtract torque from the steering system 10 in various (for example, left and right) directions independently of input of the driver. Toward that end, pressure created by the hydraulic valve 24 due to torque exerted by the driver in both directions on the steering wheel is monitored with the transducer 38 along with inputs from the vehicle into the control module 36. For optimum performance of the recirculating ball steering gear 40, the "null" position of the pole 18 relative to the permanent magnet assembly 20 must coincide with a center position of the valve spool relative to the hydraulic valve 24.

The transducer 38 converts pressure into an electrical signal. The transducer 38 may be a strain-gage-based transducer 38, in which conversion of pressure into an electrical signal is achieved by physical deformation of a strain gage or gages (not shown) bonded into a diaphragm (not shown) of the transducer 38. The diaphragm may help protect a sensor element, such as the strain gage, from fluid that is being measured. The strain gage is a resistive element resistance of which changes with an amount of strain placed on it. Pressure applied to the transducer 38 may produce a deflection of the diaphragm that introduces strain to the gages, which produces an electrical-resistance change proportional to the pressure. While some transducers compare a measuring port to a reference port, the transducer 38 is arranged such that there is a comparison between first and second measuring ports (not shown). By nature, pressure is the difference between two points or ports. Pressure between two ports (or pipe connections) is differential pressure, which may be measured in units of "PSID" ("pounds-per-square-inch differential"). Output of the transducer 38 is a voltage, which may be converted to a current so that a signal is sent as a current. By sending the signal as a current, there is no error from voltage drop introduced from resistance of a wire (whatever a length thereof is). Some applications may convert the voltage to a 4-20 mA current loop such that a pressure reading of zero would cause the transducer 38 to transmit 4 mA. A full-scale output ("FSO") of pressure—such as 100 psi—would cause the transducer 38 to transmit 20 mA.

Input of the driver is provided via the steering wheel attached to the recirculating ball steering gear 40 via a steering shaft (not shown). It should be appreciated that the steering shaft may include first and second shafts or other alternate configurations for connecting the steering wheel to the recirculating ball steering gear 40.

In an aspect of the embodiment, the recirculating ball steering gear 40 is of a conventional style. However, it should be appreciated that the recirculating ball steering gear 40 can be of any suitable style.

The magnetic actuator 14 is configured to apply the torque to the hydraulic valve 24 independently of the driver input. The control module 36 is configured to calculate an appropriate amount of current and send it to the magnetic actuator 14 to generate an output torque required from the recirculating ball steering gear 40 for a particular maneuver of the steering wheel. In this way, MTO is used on the recirculating ball steering gear 40. Operation of MTO on a rack-and-pinion steering gear is described in detail in U.S. Pat. No. 7,364,006, which is incorporated herein by reference.

In an aspect of the embodiment, the steering system 10 includes further a gear housing 42 (FIGS. 1 and 2). More specifically, the gear housing 42 is configured to house the recirculating ball steering gear 40. It should be appreciated that the gear housing 42 can be made of any suitable material. Also, as shown in FIG. 1, the steering worm 30 (which is part of a control-valve assembly of the steering system 10) is mounted on a rack-piston nut 44 via a ball circuit 46 in the same location as is mounted a regular control-valve assembly on an ordinary power rack.

By measuring an amount of assist pressure, an angle of the hydraulic valve 24 can be determined since an amount of actuation of the hydraulic valve 24 is used to control an amount of hydraulic assist. The angle can then be used to control the amount of current supplied to the magnetic actuator 14 to provide an amount of variable effort required. Also, a measurement of differential pressure informs as to how much assist is being provided. By monitoring the assist pressure relative to position of the steering wheel [as provided by, say, a position sensor (not shown) of the steering wheel], an amount of pull force can be determined. The pull force can then be reduced or eliminated by providing an appropriate amount of current to the magnetic actuator 14 so that it (and not the driver) provides a necessary torque to keep the vehicle moving straight.

The position sensor may be provided relative to the steering wheel for detecting position of the steering wheel, thus providing an indication of the driver input. In that case, a position signal is sent to a controller (not shown) for processing. Velocity of the steering wheel can be determined within the controller using the position signal.

The amount of pressure is directly proportional to an amount of torque or effort. Substantial electromagnetic torque can be available. In an aspect of the embodiment, the magnetic actuator 14 is powered with electromagnetic torque with a current of positive three amps and negative three amps (the torque being in "newton meters" and the pressure being in "bars"). It should be appreciated, however, that the available torque that the magnetic actuator 14 can produce is not constant for the valve angle. The current amount supplied is a desired torque divided by the available torque times full-scale current (e.g. three amps).

By varying the size of the magnetic actuator 14, the steering system 10 enables park-assist (along with lane-keeping, lead-and-pull compensation, driver-alert, active return-to-center, active dampening, and stability-control assist). Furthermore, the steering system 10 is hydraulically assisted for power-steering, has sufficient output, and can be packaged in the vehicle. In addition, the magnetic actuator 14 can be very compact and smaller in size than current electromagnetic actuators. Moreover, the magnetic actuator 14 can be manufactured fairly easily, which, in combination with the smaller size, makes the magnetic actuator 14 less expensive to manufacture.

While the invention has been disclosed in detail in connection with only a limited number of exemplary embodiments, it should be readily appreciated that the invention is not limited to such embodiments. Rather, the invention can be modified to incorporate any number of variations, alterations, substitutions, or equivalent arrangements not heretofore disclosed, but that are commensurate with the spirit and scope of the invention. Additionally, while various non-limiting exemplary embodiments of the invention have been disclosed, it is to be appreciated that aspects of the invention may include only some of these embodiments. Accordingly, the invention is not to be seen as limited by the foregoing disclosure.

Having thus described the invention, it is claimed:

1. A power-steering system comprising:
   a hydraulic valve;
   a differential-pressure transducer configured to monitor pressure exerted by a driver of a vehicle in various directions on a steering wheel thereof;
   a recirculating ball steering gear to which the transducer is configured to be fastened; and
   a magnetic actuator configured to generate an output of torque required from the recirculating ball steering gear for a maneuver of the steering wheel and apply the torque to the hydraulic valve independently of input by the driver.

2. The steering system of claim 1, wherein the steering system further comprises a control-valve assembly mounted in the recirculating ball steering gear.

3. The steering system of claim 1, wherein the magnetic actuator includes an electromagnetic coil, an inner and outer electromagnetic pole, and at least one permanent magnet assembly.

4. The steering system of claim 3, wherein the steering system further comprises a valve housing configured to house the magnetic actuator and the hydraulic valve and the coil, the pole, the at least one permanent magnet assembly, and the valve housing define a magnetic assembly.

5. The steering system of claim 1, wherein the steering system further comprises a gear housing configured to house the recirculating ball steering gear.

6. The steering system of claim 1, wherein the steering system further comprises a spool shaft, an output shaft, a steering worm, and right- and left-turn fluid cavities and the magnetic actuator, the hydraulic valve, the spool shaft, the output shaft, the steering worm, and the fluid cavities are operatively connected to each other.

7. The steering system of claim 6, wherein the spool shaft is connected to the steering wheel for rotation as a unit therewith and is configured for rotation.

8. The steering system of claim 6, wherein the hydraulic valve is supported on the spool shaft for rotation independent of the spool shaft.

9. The steering system of claim 6, wherein the steering worm is part of the control-valve assembly and mounted on a rack-piston nut via a ball circuit.

10. The steering system of claim 1, wherein the steering system further comprises a control module configured to calculate an appropriate amount of electric current and send the current to the magnetic actuator to generate the output torque, the torque being added to or subtracted from the steering system in any of the directions independently of the driver input by the pressure-monitoring and inputs from the vehicle into the control module.

11. The steering system of claim 10, wherein assist torque is changed as a function of speed of the vehicle and a polarity of the current changes direction of the torque to the magnetic actuator.

12. The steering system of claim 11, wherein, at any vehicle speed, the current is based upon the direction of the steering.

13. The steering system of claim 11, wherein the current is positive in a left turn and negative in a right turn to decrease steering efforts.

14. The steering system of claim 11, wherein the current is negative in a left turn and positive in a right turn to increase steering efforts.

15. A ball-nut assembly of a power-steering system comprising:
   a hydraulic valve;
   a magnetic actuator configured to generate an output of torque required from the steering system for a maneuver of a steering wheel of a vehicle by a driver thereof and apply the torque to the hydraulic valve independently of input by the driver, the steering system being configured to calculate an appropriate amount of electric current and send the current to the magnetic actuator to generate the output torque and the torque being added to or subtracted from the steering system in any of the directions independently of the driver input by monitoring by the steering system of pressure exerted by the driver in various directions on the steering wheel and inputs from the vehicle into the steering system;
   a spool shaft, an output shaft, a steering worm, and right- and left-turn fluid cavities and the magnetic actuator, the hydraulic valve, the spool shaft, the output shaft, the steering worm, and the fluid cavities are operatively connected to each other; and
   the steering worm is part of the control-valve assembly and mounted on a rack-piston nut via a ball circuit.

16. The ball-nut assembly of claim 15, wherein the magnetic actuator includes an electromagnetic coil, an inner and outer electromagnetic pole, and at least one permanent magnet assembly.

17. The ball-nut assembly of claim 15, wherein the spool shaft is connected to the steering wheel for rotation as a unit therewith and is configured for rotation.

18. The ball-nut assembly of claim 15, wherein the hydraulic valve is supported on the spool shaft for rotation independent of the spool shaft.

* * * * *